Lewis Miller.
Mower.
Nº 20,180.        Patented May 4, 1858.
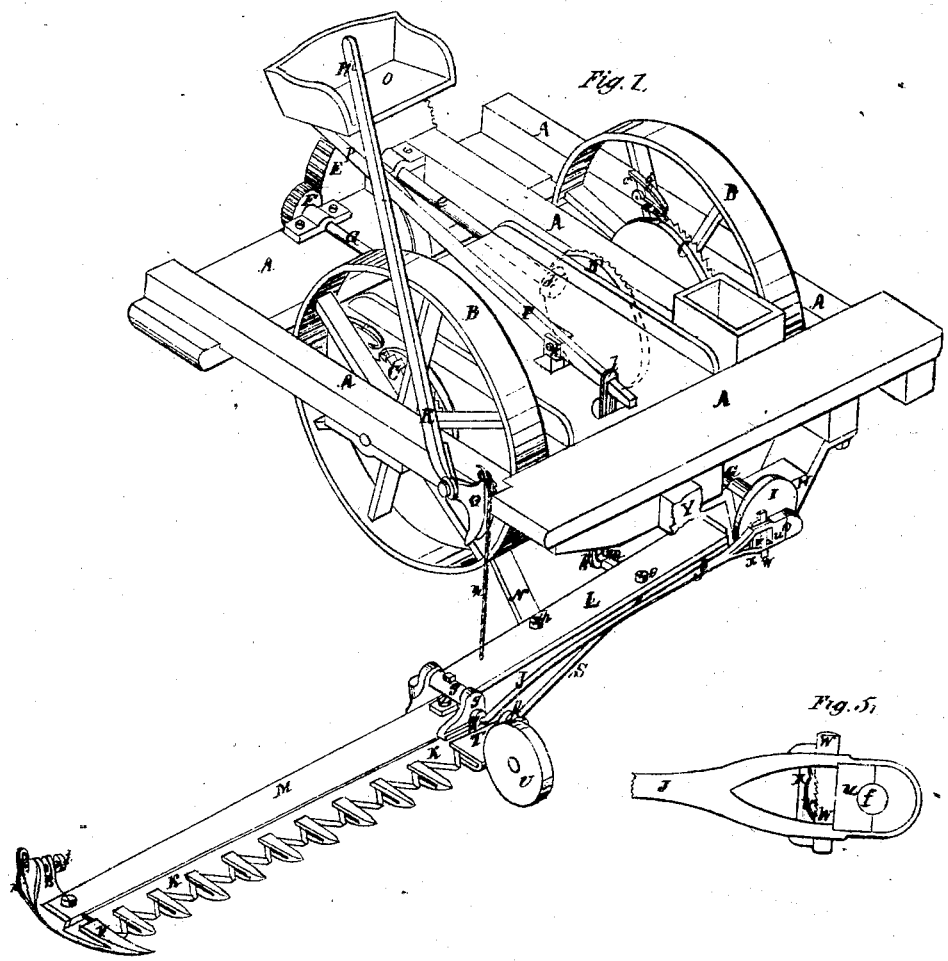
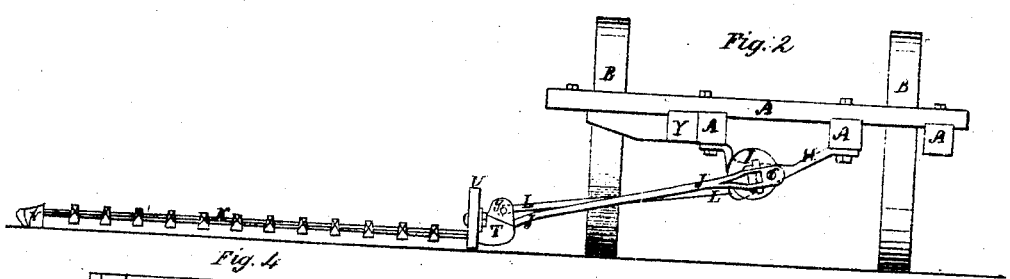
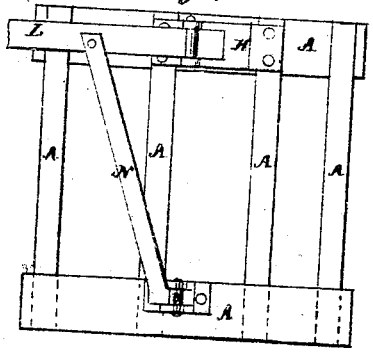
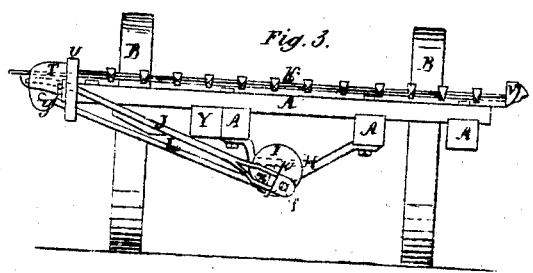

UNITED STATES PATENT OFFICE.

LEWIS MILLER, OF CANTON, OHIO, ASSIGNOR TO C. AULTMAN & CO., OF SAME PLACE.

IMPROVEMENT IN HARVESTERS.

Specification forming part of Letters Patent No. 20,180, dated May 4, 1858.

*To all whom it may concern:*

Be it known that I, LEWIS MILLER, of Canton, in the county of Stark and State of Ohio, have invented certain new and useful improvements in the manner of hanging and carrying the cutter-bar of mowing-machines; and I do hereby declare the following to be a full, clear, and exact description of the construction and operation of the same, reference being had to the accompanying drawings, making a part of this specification, in which—

Figure 1 represents in perspective the machine as arranged for mowing grass. Fig. 2 represents a front view with the cutter-bar in its working position. Fig. 3 represents a similar end view with the cutter-bar folded over and resting on the main frame for facility of transportation from place to place. Fig. 4 repsents the manner of bracing the finger or cutter bar from the rear of the main frame, so that it may have the necessary rigidity in every other direction than the one in which it folds over onto the frame.

Similar letters of reference, where they occur in the several figures, denote like parts of the machine in all of them.

The nature of my invention consists in so hanging and bracing the cutter or finger bar of a mowing-machine to the main frame as that while it is sufficiently rigid to withstand all the resistance against it when the machine is in operation, yet it may be raised up, folded over, and rested upon the main frame for facility of transportation, as will be explained.

To enable others skilled in the art to make and use my invention, I will proceed to describe the same with reference to the drawings.

A represents the main frame of the machine, which is supported upon an axle, which in turn is supported in two wheels, B B. These wheels B B are loose upon their axle; but by means of a peculiarly-constructed spring-pawl, $a$, on each of said wheels, and a ratchet-wheel, C, fast on the axle near each wheel, they can be made fast and loose at pleasure, so as to act as driving and supporting wheels, or the latter only, as occasion may require. The pawl $a$, of which there may be one, two, or more to each wheel, has a bow-spring, $b$, riveted to its front end, and the rear end of this bow-spring rests upon a pin, $c$, fastened to the same spoke of the wheel to which the pawl itself is pivoted. This bow-spring so arranged acts equally in holding the pawl (when thrown back) from the ratchet as it does (when dropped down) to the ratchet, and thus by a simple construction becomes equally serviceable in both capacities, insuring certainty of action or non-action, as the case may be.

On the axle there is a beveled-gear wheel, D, which takes into and operates a pinion, $d$, (in dotted lines,) on the shaft $e$. The shaft $e$ extends rearward to the rear end of the frame and inclines upward, so that its rear end is higher than its front end, and on the rear end of said shaft $e$ there is a gear-wheel, E, that takes into and turns a pinion, F, on the shaft G. The shaft G extends from the rear to the front of the machine, and underneath the main axle that carries the supporting and driving wheels B B, its front end being supported in a bolster or pillow-block, H, suspended to the under side of the front cross-piece of the main frame. By this mode of arranging the gearing the parts are kept up high enough on the frame to prevent them from catching or clogging by the grass or grain, and the driving-shaft G still passes underneath the main axle, which is important in the operation of the machine.

To the front end of the shaft G there is attached a crank or crank-wheel, I, to a wrist, $f$, in which one end of the pitman or connecting rod J is attached, the other end of said pitman being attached to the cutter-bar or cutters K, and by which said cutters are vibrated.

A beam, L, is hinged by one of its ends to the under side of the bolster or pillow-block H, and to the other end of this beam L is hinged, as at $g$, the finger beam or bar M, said beam L being additionally braced to the main frame by a brace, N, which is permanently secured to the beam at $h$, but which passes transversely rearward, and is hinged at its rear end to the main frame, as shown at $i$, Fig. 4. This allows the brace N to rise and fall with the beam L and still perform its function of a brace to said beam, and to the finger-bar attached to said beam to keep it in its proper position.

O is the driver's seat, placed on the opposite side of the main axle from the cutter-bar, beam, &c., for the purpose of balancing the machine and allowing the driver to throw his weight in such direction or position as will aid the machine, in passing over obstructions, to throw it into or out of the grass or grain, as circumstances may require, and generally to manage and control the machine by his position in the seat. A lever, P, having its fulcrum at k, on the main frame, extends from the driver's seat to near the front of the frame, and holds upon its front end a stirrup, l, which hangs down perpendicularly and has a slot in it, in which slot an arm, m, on the beam L rests, so that the beam may rise independent of the lever or its stirrup, but so that when required the driver may, from his seat, raise said beam for any emergency, and lower it again when necessary.

A segment, Q, having a lever, R, connected to it, is pivoted to that side of the main frame next the standing grass or grain, at a point over the beam L, said beam being suspended to said segment or arc and lever by a cord or chain, n, so that it may be raised or lowered or adjusted thereby. On the inner face of the arc (next the frame) there is a ratchet, the teeth of which will catch and hold against a dog fastened to the frame, so that the beam L may be held at any desirable adjusted height.

A brace, S, extends from the beam L to the inside shoe, T, to support it, this brace being rigid at its end o and hinged at its end p, said hinge being in line with the one, g, connecting the finger-bar M with the beam L. It will also be perceived that the pitman J is connected to the cutters or cutter-bar by a jointed connection, as at q, which joint, at a certain position in the line of vibration of said cutters, also comes into or near the plane of the other hinges, g p, so that the beam L may be raised up close to the under side of the front cross-piece of the frame, and then the cutter and finger-bar folded over, so as to lie upon the top of said front piece of the frame, as shown in Fig. 3, where it can rest while the machine is moved from place to place.

Fig. 2 represents the cutters as in position for mowing, with their several connections in their working positions, while in Fig. 3 is represented the positions of the same parts when the cutters and their beam, &c., are folded over and resting on the main frame.

T is the inside shoe, having a wheel, U, peculiarly located thereon, and V is the outside shoe or divider, having an adjustable sole or runner, r, thereon, and a slot, s, and pin t for a track-clearer; but as these shoes or dividers constitute the subject-matter of another application for Letters Patent their peculiar functions need not here be more fully referred to, their general position being shown in the drawings.

In Fig. 5 I have shown on an enlarged scale the manner of holding the key W in place against the adjustable half u of the box that the wrist-pin f on the crank-wheel I works in. It has been found very difficult heretofore to keep this key in its place, the motion or jar of the machine causing it to jump out, and thus loose, injure, or break the parts. I prevent this in the following manner, viz: I make ratchet-teeth on one face of the key, into which a spring-dog, v, that is fast on the double-headed key X, takes, and thus entirely prevents the key W from getting loose or jumping out. When it becomes necessary to tighten the follower u the key W is tapped down, the dog slipping over the inclined face of the ratchet-teeth and taking into each tooth and there firmly holding the key when adjusted. To take out the key or detach the pitman a pointed tool is put against the spring-dog v, pressing it into the recess in the double-headed key X, and then the key W can be raised out and the parts disconnected.

The machine here represented has upon it all the necessary fixtures for attaching a platform and reel to convert it into a reaping-machine. Some of these connections, forming the subject-matter of other applications for Letters Patent, need not here be alluded to in detail.

Y represents the broken end of the tongue, showing its point of connection to the main frame.

Having thus fully described the nature and object of my invention, what I claim therein as new, and desire to secure by Letters Patent, is—

1. So hinging the bar or beam which carries the cutters and fingers to the beam L as that it may be raised up, folded over, and carried upon the main frame, substantially as herein described.

2. In combination with the beam L, hinged as herein described, the braces N S, rigidly connected therewith, but hinged at their opposite ends, so that the beam L may rise and fall at pleasure, but be permanently braced in its proper position to give the cutter and finger bars or beams in turn their proper working position, as herein described and represented.

LEWIS MILLER.

Witnesses:
DANIEL GOTSHALL,
ELI WAGNER.